(12) United States Patent
Li et al.

(10) Patent No.: US 12,442,745 B2
(45) Date of Patent: Oct. 14, 2025

(54) METHOD FOR MEASURING ACTIVATION ENERGY OF CATALYST

(71) Applicant: SHANGHAI INSTITUTE OF MICROSYSTEM AND INFORMATION TECHNOLOGY, CHINESE ACADEMY OF SCIENCES, Shanghai (CN)

(72) Inventors: Xinxin Li, Shanghai (CN); Xinyu Li, Shanghai (CN); Pengcheng Xu, Shanghai (CN); Fanglan Yao, Shanghai (CN); Li Su, Shanghai (CN)

(73) Assignee: SHANGHAI INSTITUTE OF MICROSYSTEM AND INFORMATION TECHNOLOGY, CHINESE ACADEMY OF SCIENCES, Shanghai (CN)

( * ) Notice: Subject to any disclaimer, the term of this patent is extended or adjusted under 35 U.S.C. 154(b) by 0 days.

(21) Appl. No.: 18/289,751

(22) PCT Filed: Dec. 28, 2021

(86) PCT No.: PCT/CN2021/141887
§ 371 (c)(1),
(2) Date: Nov. 4, 2024

(87) PCT Pub. No.: WO2022/237192
PCT Pub. Date: Nov. 17, 2022

(65) Prior Publication Data
US 2025/0067649 A1   Feb. 27, 2025

(30) Foreign Application Priority Data
May 8, 2021 (CN) .......................... 202110501613.3

(51) Int. Cl.
*G01N 5/02*   (2006.01)
*G01N 13/00*  (2006.01)
*G01N 25/00*  (2006.01)

(52) U.S. Cl.
CPC ............... *G01N 5/02* (2013.01); *G01N 13/00* (2013.01); *G01N 25/00* (2013.01)

(58) Field of Classification Search
CPC ........... G01N 5/02; G01N 13/00; G01N 25/00
See application file for complete search history.

(56) References Cited

U.S. PATENT DOCUMENTS 5,719,324 A    2/1998   Thundat et al.
5,737,086 A *  4/1998   Gerber ................. G01N 25/482
                                                       356/432

(Continued)

FOREIGN PATENT DOCUMENTS

CN    1490620 A    4/2004
CN    1719240 A    1/2006

(Continued)

OTHER PUBLICATIONS

Felts et al. Heated Atomic Force Microscope Cantilevers and their Applications, 2013.*

(Continued)

*Primary Examiner* — Arleen M Vazquez
*Assistant Examiner* — Lynda Dinh
(74) *Attorney, Agent, or Firm* — IPRTOP LLC (57) ABSTRACT

A method for measuring activation energy of a catalyst is disclosed, which includes obtaining a resonant frequency change-time curve using an integrated self-heating resonant cantilever (100), converting the resonant frequency change-time curve into a resonant frequency change-temperature curve, converting the resonant frequency change-temperature curve into a coverage-temperature curve, obtaining a (Continued)

coverage change rate-temperature curve by performing first-order differentiation on the coverage-temperature curve, obtaining relevant parameters corresponding to local minimum values from the coverage change rate-temperature curve, and substituting the relevant parameters into calculation formulas to obtain a desorption rate constant of the catalyst and a desorption activation energy of the catalyst. It can be seen that the present disclosure simply requires programmed heating in terms of operating on the samples, which is fast and convenient. In addition, the method also has other advantages, such as, accurate measurement results, low consumption of samples, and low price.

9 Claims, 4 Drawing Sheets

(56) References Cited

U.S. PATENT DOCUMENTS

| | | | | |
|---|---|---|---|---|
| 8,434,161 | B1 * | 4/2013 | Adams | G01N 27/007 |
| | | | | 422/50 |
| 9,726,665 | B2 * | 8/2017 | Adams | G01N 33/54366 |
| 2013/0047303 | A1 | 2/2013 | King et al. | |
| 2013/0276175 | A1 * | 10/2013 | King | G01Q 10/045 |
| | | | | 850/40 |
| 2014/0192836 | A1 | 7/2014 | Neilson | |

FOREIGN PATENT DOCUMENTS

| | | |
|---|---|---|
| CN | 101492150 A | 7/2009 |
| CN | 104897508 A | 9/2015 |
| CN | 111362226 A | 7/2020 |

OTHER PUBLICATIONS

Tang, Lei; (Non-official translation: Research on the Chemical Sensing Mechanism of H2S Gas Based on Resonant Micro-Cantilever and Performance Evaluation of Solid Acid-Base Catalysts ), Engineering Science & Technology I, China Master's Theses Full-Text Database), No. {0} 7, Jul. 15, 2020 (Jul. 15, 2020), ISSN:1000-7512 , 1-10 pp. 1-5, CN.

Xie, Bo et al.; (Theoretical Study of Temperature Programmed Desorption for Hydrogen Isotopes Separation by Chromatographic Columns), (Journal of Isotopes), vol. {0} 21, No. {0} 1, Feb. 29, 2008 (Feb. 29, 2008), ISSN: 1000-7512 , 1-10, pp. 1-5, CN.

Wang, Yang et al., (Mechanism of Adsorption and Desorption of CO on SrO(001) Surface), (Acta Chimica Sinica), vol. {0} 62, No. {0} 7, Jul. 31, 2004 (Jul. 31, 2004),, ISSN:0567-7351. 1-10, pp. 657-661, CN.

* cited by examiner

METHOD FOR MEASURING ACTIVATION ENERGY OF CATALYST

TECHNICAL FIELD

The present disclosure relates to the field of quantitative characterization of catalysts, and in particular, to a method for measuring activation energy of a catalyst.

BACKGROUND

In chemical industrial production, catalytic processes account for more than 80% of all chemical processes. Catalysts are widely used in fields such as, energy, pharmaceuticals, oil refining industry, modern chemical industry, and environmental protection. Therefore, catalytic technology has become one of the key technologies in many countries. However, catalysis itself is a complex interdisciplinary science, and it is still a technical problem facing technical persons in the field to characterize dynamic processes of adsorption and desorption of materials with active sites such as catalysts, to quantitatively measure characteristic parameters of catalysts, and to carry out new theories and technologies for the characterization of catalysts.

Activation energy of catalysts can be measured by using a commercial temperature programmed desorption (TPD) instrument of a chromatography/mass spectrometer. In the above method for measuring activation energy of the catalysts, multiple heating and cooling processes are performed at different programmed heating rates, and samples are changed in each heating and cooling process. By performing multiple heating and cooling processes, different heating rates $\beta$ and temperatures values $T_m$ corresponding to desorption peaks can be obtained, and the kinetic parameters such as desorption rate constant $k_d$ and a desorption activation energy $E_d$ are estimated by graphical fitting.

However, when measuring the activation energy of catalysts using the commercial TPD instrument with non-in situ detection, a signal detection (i.e., a temperature detection) is performed in a gas pipeline connected after a programmed-heating sample pool or by using an external chromatography/mass spectrometer, so measured temperature values lag behind actual temperature values of the programmed heating; furthermore, the concentration of desorbed gases is often below a lower detection limit of the detector, making it difficult to detect desorbed gases or causing inaccurate measurement of the concentration of desorbed gases, and thus affecting the accuracy of the measurement results. Meanwhile, it takes time and effort to perform multiple programmed heating and cooling processes, and multiple sample changes during measuring activation energy of catalysts. In addition, the detection device has the disadvantages of complex structure, high price, and high consumption of samples.

Therefore, it is necessary to provide a method for measuring activation energy of a catalyst.

SUMMARY

The present disclosure provides a method for measuring activation energy of a catalyst for solving problems in the related art, such as, poor accuracy, long time-consuming, high consumption of samples, high cost, etc.

The present disclosure provides the method for measuring activation energy of the catalyst, which includes:
providing an integrated self-heating resonant cantilever;
placing the catalyst in a sampling area of the integrated self-heating resonant cantilever;
providing a probe molecule, and adsorbing the probe molecule with the catalyst;
desorbing the probe molecule from the catalyst by performing programmed heating on the integrated self-heating resonant cantilever, and obtaining a resonant frequency change-time curve of the integrated self-heating resonant cantilever during the programmed heating;
converting the resonant frequency change-time curve into a resonant frequency change-temperature curve by means of a formula $T=\beta t$, wherein T represents a temperature of the integrated self-heating resonant cantilever, t represents a heating duration of the programmed heating, and $\beta$ represents a heating rate of the programmed heating;
converting the resonant frequency change-temperature curve into a coverage-temperature curve by means of a formula $$\theta = \frac{\Delta f_m - \Delta f}{\Delta f_m},$$

wherein $\theta$ represents the coverage, $\Delta f_m$ represents a total resonant frequency change during the desorbing of the probe molecule, $\Delta f$ represents a transient resonant frequency change at a certain time during the desorbing of the probe molecule;
obtaining a coverage change rate-temperature curve by performing first-order differentiation on the coverage-temperature curve, and obtaining $T_m$ and $$\left(\frac{d\theta}{dT}\right)_{T_m}$$

corresponding to local minimum values of the coverage change rate-temperature curve, wherein $T_m$ represents a temperature value where the coverage change rate-temperature curve has a local minimum, $$\left(\frac{d\theta}{dT}\right)_{T_m}$$

represents a coverage change rate where the coverage change rate-temperature curve has a local minimum; and
obtaining a desorption rate constant $k_d$ of the catalyst and a desorption activation energy $E_d$ of the catalyst by means of a formula $$k_d = -\frac{\beta\left(\frac{d\theta}{dT}\right)_{T_m}}{\theta_{T_m}}$$

and a formula $$E_d = \frac{RT_m^2 k_d}{\beta},$$

wherein R represents the gas constant.

In an embodiment, before the catalyst adsorbs the probe molecule, the method further includes cleaning the integrated self-heating resonant cantilever.

In an embodiment, before the catalyst adsorbs the probe molecule, the method further includes pretreating the catalyst to clean the catalyst.

In an embodiment, after the catalyst adsorbs the probe molecule and before the catalyst desorbs the probe molecule, the method further includes removing physical adsorbate on the catalyst.

In an embodiment, the step of obtaining the resonant frequency change-time curve includes:

obtaining a first preliminary resonant frequency change-time curve by performing a first programmed heating on the integrated self-heating resonant cantilever;

obtaining a second preliminary resonant frequency change-time curve by performing a second programmed heating on the integrated self-heating resonant cantilever; and obtaining the resonant frequency change-time curve by subtracting the second preliminary resonant frequency change-time curve from the first preliminary resonant frequency change-time curve.

In an embodiment, a mass of the catalyst is in a range of $10^{-12}$ g to $10^{-6}$ g.

In an embodiment, the temperature T of the integrated self-heating resonant cantilever during the programmed heating is in a range of 25° C. to 1000° C.

In an embodiment, the heating rate β of the programmed heating is greater than 5000° C./s, with a temperature control accuracy smaller than 0.5° C.

In an embodiment, the catalyst includes one of a ZSM-5 molecular sieve, a LaY molecular sieve, and a NaY molecular sieve, wherein the probe molecule includes an ammonia molecule.

In an embodiment, the integrated self-heating resonant cantilever includes a resonant cantilever, a resonant drive circuit, a resonant frequency detection circuit, a heating component, and a temperature detection circuit, wherein the resonant drive circuit drives the resonant cantilever to generate a resonant frequency, wherein the resonant frequency detection circuit measures the resonant frequency generated by the resonant cantilever in real-time, wherein the heating component heats the catalyst, wherein the temperature detection circuit measures a temperature of the resonant cantilever in real-time.

As described above, the method for measuring activation energy of the catalyst of the present disclosure has the following beneficial effects:

In the present disclosure, the resonant frequency change-time curve can be obtained using the integrated self-heating resonant cantilever, the resonant frequency change-time curve can be converted into the resonant frequency change-temperature curve, the resonant frequency change-temperature curve can be converted into the coverage-temperature curve, the coverage change rate-temperature curve is obtained by performing first-order differentiation on the coverage-temperature curve, relevant parameters corresponding to local minimum values can be obtained from the coverage change rate-temperature curve, and then the relevant parameters are substituted into the calculation formulas to obtain the desorption rate constant of the catalyst and the desorption activation energy of the catalyst. It can be seen that the method for measuring activation energy of the catalyst of the present disclosure simply requires programmed heating in terms of operating on the samples, which is fast and convenient. In addition, the method also has other advantages, such as, accurate measurement results, low consumption of samples, and low price.

REFERENCE NUMERALS

100 Resonant cantilever
201 Resonant drive circuit
202 Resonant frequency detection circuit
203 Temperature detection circuit
204 Heating component
A Sampling area

DETAILED DESCRIPTION

The present disclosure will be described below through specific examples. Those skilled in the art can easily understand the other advantages and effects of the present disclosure according to contents disclosed in the specification. The present disclosure may also be implemented or applied through other different embodiments, and various modifications or changes may be made to all details in the specification based on different points of view and applications without departing from the spirit of the present disclosure.

For example, when describing the embodiments of the present disclosure in detail, for ease of description, a cross-sectional view for showing a device structure is partially enlarged not necessarily to scale, and the schematic diagram is merely an example and is not intended to limit the scope of the present disclosure. In addition, the three-dimensional spatial dimensions of length, width and depth should be included in the actual production.

For ease of description, spatial terms, such as "under", "below", "lower", "beneath", "above", "upper", and the like, may be used herein to describe the relationship between one element or feature and another element or feature as shown in the accompanying drawings. It is to be understood that these spatial terms are intended to encompass other directions of the device in use or operation than the directions depicted in the accompanying drawings. In addition, when a layer is referred to as being "between" two layers, the layer may be the only layer between the two layers, or one or more layers may be present therebetween. As used herein, "between . . . and . . . " means that two endpoint values are included.

In the context of this present disclosure, a structure in which a first feature is described as being "on" a second feature may include an embodiment in which the first feature and the second feature are in direct contact with each other, or may include an embodiment in which there is another feature formed between the first feature and the second feature. In other words, the first feature and the second feature may not be in direct contact with each other.

It should be noted that the drawings provided herein only exemplify the basic idea of the present disclosure. Only components closely related to the present disclosure are shown in the drawings, and they are not necessarily drawn according to the quantities, shapes, and sizes of the components during actual implementation. During actual implementation, the patterns, quantities, and proportions of the components may be changed as needed, and the layout of the components may also be more complicated.

As shown in FIGS. 1A-1D and FIGS. 2-3, the present disclosure provides a method for measuring activation energy of a catalyst, which includes steps S11, S12, S13, S14, S15, S16, and S17.

Figure 2:
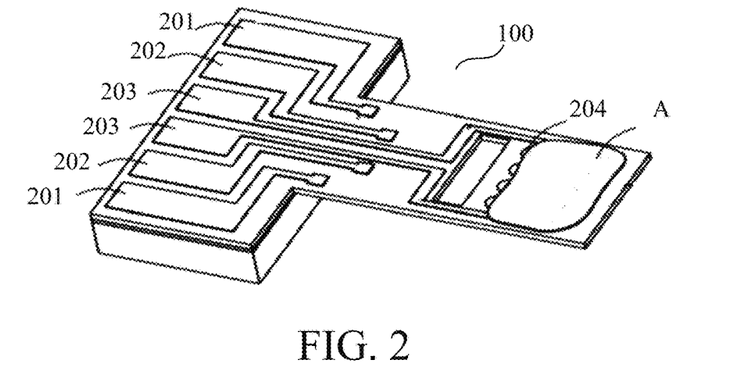
FIG. 2 is a schematic structural diagram of an integrated self-heating resonant cantilever according to an embodiment of the present disclosure.

In step S11, as shown in FIG. 2, an integrated self-heating resonant cantilever is provided.

In an embodiment, the integrated self-heating resonant cantilever includes a resonant cantilever 100, a resonant drive circuit 201, a resonant frequency detection circuit 202, a heating component 204, and a temperature detection circuit 203. The resonant drive circuit 201 drives the resonant cantilever 100 to generate a resonant frequency. The resonant frequency detection circuit 202 measures the resonant frequency generated by the resonant cantilever 100 in real-time. The heating component 204 heats the catalyst. The temperature detection circuit 203 measures a temperature of the resonant cantilever 100 in real-time.

The heating component 204 is located at a cantilever end of the resonant cantilever 100, the cantilever end having a sample area A is for holding a sample, and the heating component 204 is located at the sample area A to heat the sample. The integrated self-heating resonant cantilever may also include a data acquisition and control system connected to the above circuits (e.g., the resonant drive circuit 201, the resonant frequency detection circuit 202, and the temperature detection circuit 203).

In step S12, the catalyst is placed in the sampling area A of the integrated self-heating resonant cantilever.

In step S13, a probe molecule is provided, and the probe molecule is adsorbed with the catalyst.

Figure 1A:
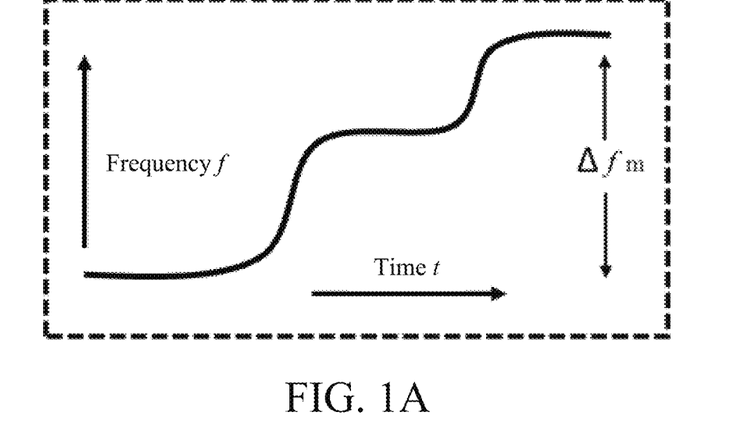
FIG. 1A shows a resonant frequency change-time curve of an integrated self-heating resonant cantilever according to an embodiment of the present disclosure.

In step S14, the probe molecule is desorbed from the catalyst by performing programmed heating on the integrated self-heating resonant cantilever, and a resonant frequency change-time curve is shown in FIG. 1A of the integrated self-heating resonant cantilever is obtained during the programmed heating.

Figure 1B:
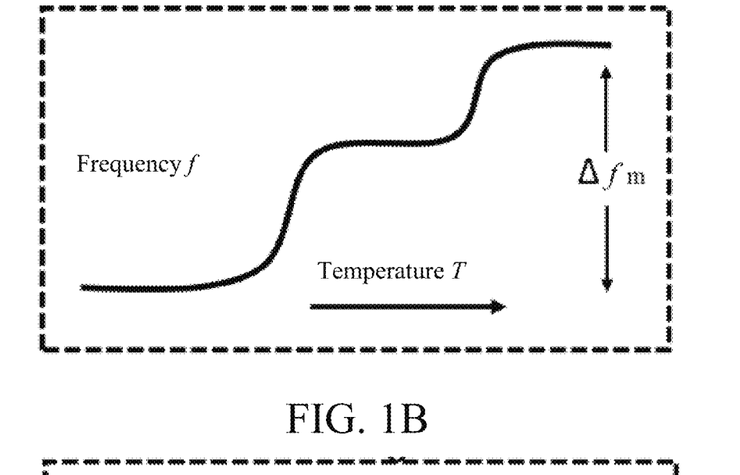
FIG. 1B shows a resonant frequency change-temperature curve of an integrated self-heating resonant cantilever according to an embodiment of the present disclosure.
Figure 3:
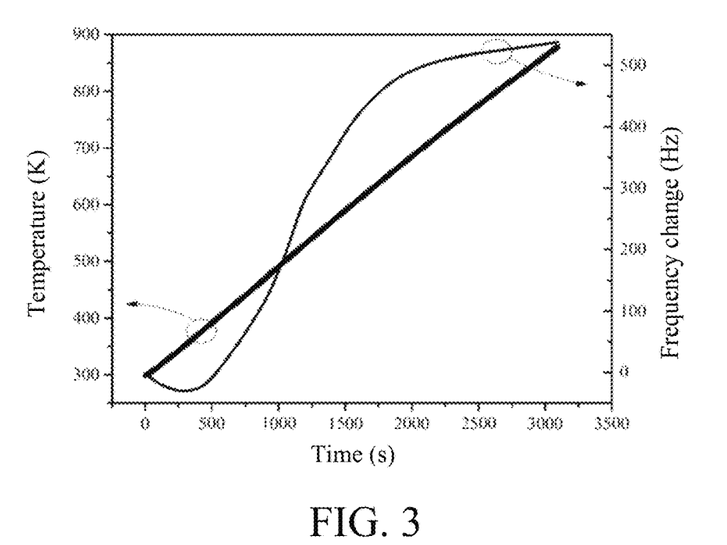
FIG. 3 shows a resonant frequency change-time curve of a catalyst measured using an integrated self-heating resonant cantilever according to an embodiment of the present disclosure.

In step S15, the resonant frequency change-time curve is converted into a resonant frequency change-temperature curve shown in FIG. 1B by means of a formula T=βt, wherein T represents a temperature of the integrated self-heating resonant cantilever, t represents a heating duration of the programmed heating, and β represents a heating rate of the programmed heating. FIG. 3 shows the resonant frequency change-time curve of the catalyst obtained using the integrated self-heating resonant cantilever.

In step S16, the resonant frequency change-temperature curve is converted into a coverage-temperature curve by means of a formula $$\theta = \frac{\Delta f_m - \Delta f}{\Delta f_m},$$

wherein $\theta$ represents the coverage, $\Delta f_m$ represents a total resonant frequency change during the desorbing of the probe molecule, $\Delta f$ represents a transient resonant frequency change at a certain time during the desorbing of the probe molecule;

In step S17, a coverage change rate-temperature curve is obtained by performing first-order differentiation on the coverage-temperature curve, and $T_m$ and $$\left(\frac{d\theta}{dT}\right)_{T_m}$$

corresponding to local minimum values of the coverage change rate-temperature curve are obtained, wherein $T_m$ represents a temperature value where the coverage change rate-temperature curve has a local minimum, $$\left(\frac{d\theta}{dT}\right)_{T_m}$$

represents a coverage change rate where the coverage change rate-temperature curve has a local minimum; and In step S18, a desorption rate constant $k_d$ of the catalyst and a desorption activation energy $E_d$ of the catalyst are obtained by means of a formula $$k_d = -\frac{\beta\left(\frac{d\theta}{dT}\right)_{T_m}}{\theta_{T_m}}$$

and a formula $$E_d = \frac{RT_m^2 k_d}{\beta},$$

wherein R represents the gas constant.

In the present disclosure, the resonant frequency change-time curve can be obtained using the integrated self-heating resonant cantilever, the resonant frequency change-time curve can be converted into the resonant frequency change-temperature curve, the resonant frequency change-temperature curve can be converted into the coverage-temperature curve, the coverage change rate-temperature curve is obtained by performing first-order differentiation on the coverage-temperature curve, relevant parameters corresponding to local minimum values can be obtained from the coverage change rate-temperature curve, and then the relevant parameters are substituted into the calculation formulas to obtain the desorption rate constant of the catalyst and the desorption activation energy of the catalyst. It can be seen that the method for measuring activation energy of the catalyst of the present disclosure simply requires programmed heating in terms of operating on the samples, which is fast and convenient. In addition, the method also has other advantages, such as, accurate measurement results, low consumption of samples, and low price.

In an embodiment, before the catalyst adsorbs the probe molecule, the method further includes cleaning the integrated self-heating resonant cantilever, and/or pretreating the catalyst to clean the catalyst, thereby avoiding the influence of impurities on subsequent measurement results.

In an embodiment, after the catalyst adsorbs the probe molecule and before the catalyst desorbs the probe molecule, the method further includes removing physical adsorbate on the catalyst, to avoid the influence of physical adsorbate on the measurement results, thereby improving the accuracy of measuring chemical adsorbate.

In an embodiment, the step of obtaining the resonant frequency change-time curve includes:
  obtaining a first preliminary resonant frequency change-time curve by performing a first programmed heating on the integrated self-heating resonant cantilever;
  obtaining a second preliminary resonant frequency change-time curve by performing a second programmed heating on the integrated self-heating resonant cantilever; and
  obtaining the resonant frequency change-time curve by subtracting the second preliminary resonant frequency change-time curve from the first preliminary resonant frequency change-time curve.

In an embodiment, the method for measuring activation energy of the catalyst is as follows:

(1) Cleaning the Integrated Self-Heating Resonant Cantilever

In an embodiment, the programmed heating is performed on the integrated self-heating resonant cantilever under the atmosphere of argon blowing at a flow rate of 50 mL/min, to remove the original contamination from the integrated self-heating resonant cantilever and to avoid any effect on measuring activation energy of the catalyst. A three-way power supply (e.g., a three-way power supply of model E3631A produced by Agilent) provides a voltage for the programmed heating.

(2) Preparing the Sample

In an embodiment, the catalyst to be tested is uniformly dispersed in a solvent, for example, the catalyst to be tested is placed in a microcentrifuge tube, a soluble liquid (e.g., deionized water or ethanol) is added to the microcentrifuge tube, and then the microcentrifuge tube is placed in an ultrasonic machine and sonicated for 5 min, so that the catalyst to be tested is fully dispersed in the soluble liquid to form a suspension. The dispersed sample solution (i.e., the suspension) can be precisely spotted onto the sampling area of the resonant cantilever using a micromanipulator of model PatchMan NP 2 produced by Eppendorf. The integrated self-heating resonant cantilever coated with the above suspension is placed in a target atmosphere for extension.

(3) Pretreating the Sample

In an embodiment, in order to clean the surface of the catalyst, the catalyst to be tested is pretreated, for example, the integrated self-heating resonant cantilever is heated at a certain temperature for a certain period of time under the atmosphere of argon blowing at a flow rate of 50 mL/min.

(4) Adsorbing the Probe Molecule

In an embodiment, the integrated self-heating resonant cantilever is heated at a certain temperature in an ammonia gas sweeping atmosphere with a flow rate of 50 mL/min to make the catalyst to be tested adsorb the probe molecule, a real-time frequency measurement is performed to determine the degree of adsorption of the catalyst during the adsorption of the catalyst, and the adsorption is completed when the coverage of the catalyst is 1.

(5) Removing Physical Adsorbate on the Sample

In an embodiment, the integrated self-heating resonant cantilever is heated at a certain temperature for a certain period of time in an argon gas sweeping atmosphere with a flow rate of 50 mL/min to remove physical adsorbate on the catalyst to be tested.

(6) Performing a First Programmed Heating to Obtain a First Preliminary Resonant Frequency Change-Time Curve In an embodiment, the first programmed heating is performed on the integrated self-heating resonant cantilever in an argon gas sweeping atmosphere with a flow rate of 50 mL/min, and a resonant frequency signal detection system measures the resonant frequency of the integrated self-heating resonant cantilever in real-time, to obtain the first preliminary resonant frequency change-time curve during the first programmed heating.

(7) Performing a Second Programmed Heating to Obtain a Sample Baseline

In an embodiment, the first preliminary resonant frequency change-time curve obtained in the previous step (i.e., step (6)) includes a resonant frequency change generated by the sample (i.e., the catalyst) and a resonant frequency change generated by the integrated self-heating resonant cantilever. Therefore, after the previous step (i.e., step (6)), the second programmed heating is performed on the integrated self-heating resonant cantilever to obtain the second preliminary resonant frequency change-time curve, and the second preliminary resonant frequency change-time curve is used as the sample baseline.

(8) Processing Data

In an embodiment, the second preliminary resonant frequency change-time curve measured in step (7) is subtracted from the first preliminary resonant frequency change-time curve measured in step (6), so that interference items can be removed to obtain the desired resonant frequency change-time curve shown in FIG. 1A, thereby improving the accuracy.

The resonant frequency change-temperature curve in FIG. 3 is obtained according to the formula $T=\beta t$ indicating a fixed numerical relationship between the heating duration t of the programmed heating and the temperature T. The resonant frequency change-temperature curve in FIG. 1B is a desorption curve obtained by measuring activation energy of the catalyst of the present disclosure.

Figure 1C:
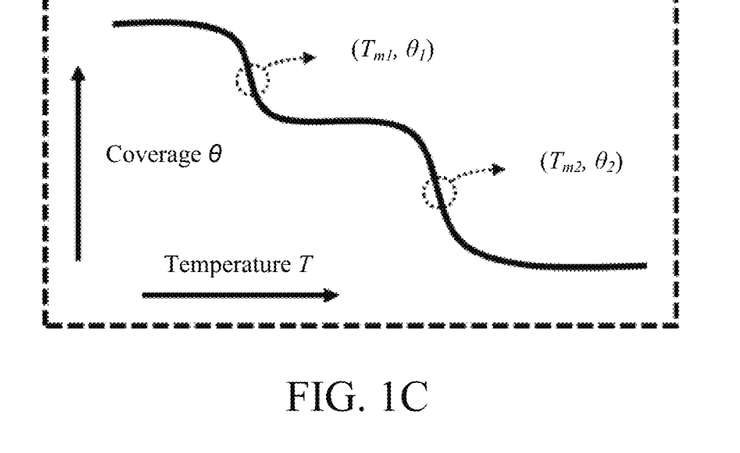
FIG. 1C shows a coverage-temperature curve of an integrated self-heating resonant cantilever according to an embodiment of the present disclosure.

The resonant frequency change-temperature curve is converted into the coverage-temperature curve in FIG. 1C according to the formula $$\theta = \frac{\Delta f_m - \Delta f}{\Delta f_m}.$$

Figure 1D:
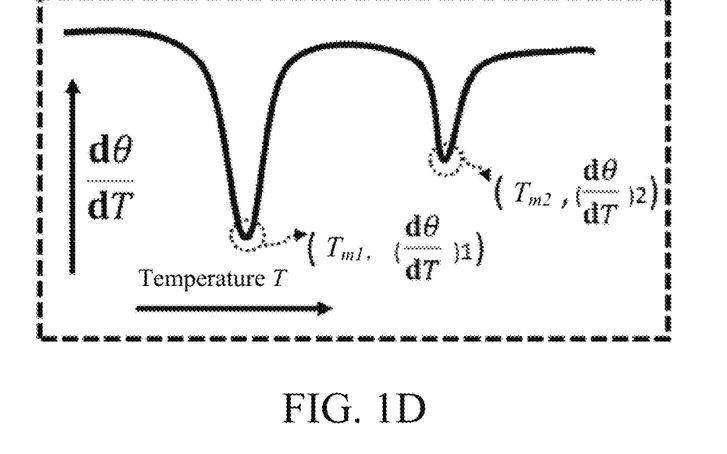
FIG. 1D shows a coverage change rate-temperature curve of an integrated self-heating resonant cantilever according to an embodiment of the present disclosure.

The coverage change rate-temperature curve is obtained by performing first-order differentiation on the coverage-temperature curve, and then $T_m$ and $$\left(\frac{d\theta}{dT}\right)_{T_m}$$

in FIG. 1D corresponding to local minimum values of the coverage change rate-temperature curve are obtained.

The desorption rate constant $k_d$ of the catalyst and the desorption activation energy $E_d$ of the catalyst are obtained according to the formula $$k_d = -\frac{\beta\left(\frac{d\theta}{dT}\right)_{T_m}}{\theta_{T_m}}$$

and the formula $$E_d = \frac{RT_m^2 k_d}{\beta}.$$

In an embodiment, a mass of the catalyst is in a range of $10^{-12}$ g to $10^{-6}$ g.

In an embodiment, the method for measuring activation energy of the catalyst requires less sample, for example, the mass of the catalyst can be $10^{-12}$ g, $10^{-9}$ g, $10^{-6}$ g, etc.; the mass of the catalyst required in the present disclosure can be reduced to the order of $10^{-12}$ g, and the accuracy and sensitivity of the method in the present disclosure are high.

In an embodiment, the temperature T of the integrated self-heating resonant cantilever during the (first or second) programmed heating is in a range of 25° C. to 1000° C., e.g., 25° C., 100° C., 500° C., 1000° C., etc.

In an embodiment, the heating rate $\beta$ of the programmed heating is greater than 5000° C./s (e.g., 5000° C./s, 8000° C./s, etc.), with a temperature control accuracy smaller than 0.5° C. (e.g., 0.5° C., 0.3° C., etc.). It can be seen that the present disclosure achieves precise temperature control without hysteresis.

The methods for measuring activation energy of the catalyst are described in the following embodiments.

Embodiment 1

In Embodiment 1, the catalyst is a ZSM-5 molecular sieve.

Following the method for measuring activation energy of the catalyst described above, the catalyst to be tested is a powdered ZSM-5 molecular sieve, which can be purchased from a catalyst factory of Nankai University and whose silica-alumina ratio (a molar ratio of silicon dioxide $SiO_2$ to aluminum trioxide $Al_2O_3$) is about 18. The ZSM-5 molecular sieve is dispersed into an ethanol solution to obtain a suspension, and then the suspension is coated on the sampling area of the above integrated self-heating resonant cantilever. Subsequently, programmed heating is performed on the integrated self-heating resonant cantilever, the resonant frequency change-temperature curve of the integrated self-heating resonant cantilever is obtained by a cantilever temperature control system and a resonant frequency signal detection system, the resonant frequency change-temperature curve is converted into the coverage-temperature curve, and the coverage change rate-temperature curve is obtained by performing first-order differentiation on the coverage-temperature curve, relevant parameters corresponding to local minimum values of the coverage change rate-temperature curve can be obtained from the coverage change rate-temperature curve, and then the relevant parameters are substituted into calculation formulas to obtain kinetic parameters, e.g., the desorption rate constant $k_d$ of the catalyst and the desorption activation energy $E_d$ of the catalyst.

Figure 4:
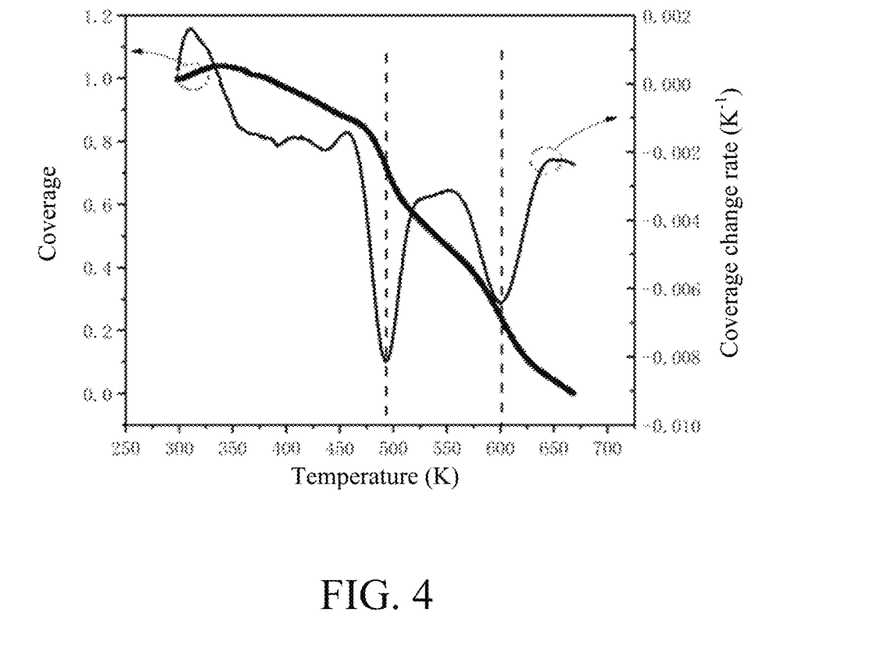
FIG. 4 shows a curve of activation energy of a ZSM-5 molecular sieve according to Embodiment 1 of the present disclosure.

The probe molecule is an ammonia molecule, the testing atmosphere is an argon atmosphere, and the heating rate $\beta$ of the programmed heating is 0.1237 K/s. The measured data is processed to obtain the coverage-temperature curve and the coverage change rate-temperature curve shown in FIG. 4. FIG. 4 is the data processing graph of the kinetic parameters (e.g., the desorption rate constant and the desorption activation energy) of the ZSM-5 molecular sieve in Embodiment 1. As can be seen from FIG. 4, the coverage change rate-temperature curve of the ZSM-5 molecular sieve has two desorption peaks, i.e., two acidic sites. $T_m$ and $$\left(\frac{d\theta}{dT}\right)_{T_m} \left(\text{i.e., } T_{m1} = 493 \text{ K,}\right.$$

$$\left.\left(\frac{d\theta}{dT}\right)_{T_{m1}} = -0.0083; T_{m2} = 601 \text{ K}, \left(\frac{d\theta}{dT}\right)_{T_{m2}} = -0.0064\right)$$

corresponding to the two local minimum values can be obtained from the coverage change rate-temperature curve (i.e., the $d\theta/dT$–T curve) in FIG. 4, two corresponding coverages (i.e., $\theta_1$=0.720, $\theta_2$=0.240) can also be obtained from the coverage-temperature curve in FIG. 4, and the desorption rate constant $k_d$ and the desorption activation energy $E_d$ of two acidic sites can be calculated according the formula $$k_d = -\frac{\beta\left(\frac{d\theta}{dT}\right)_{T_m}}{\theta_{T_m}}$$

and the formula $$E_d = \frac{RT_m^2 k_d}{\beta},$$

that is, $k_{d1}$=0.0014, $E_{d1}$=23294 J/mol; $k_{d2}$=0.0033, $E_{d2}$=80081 J/mol.

Embodiment 2

Figure 5:
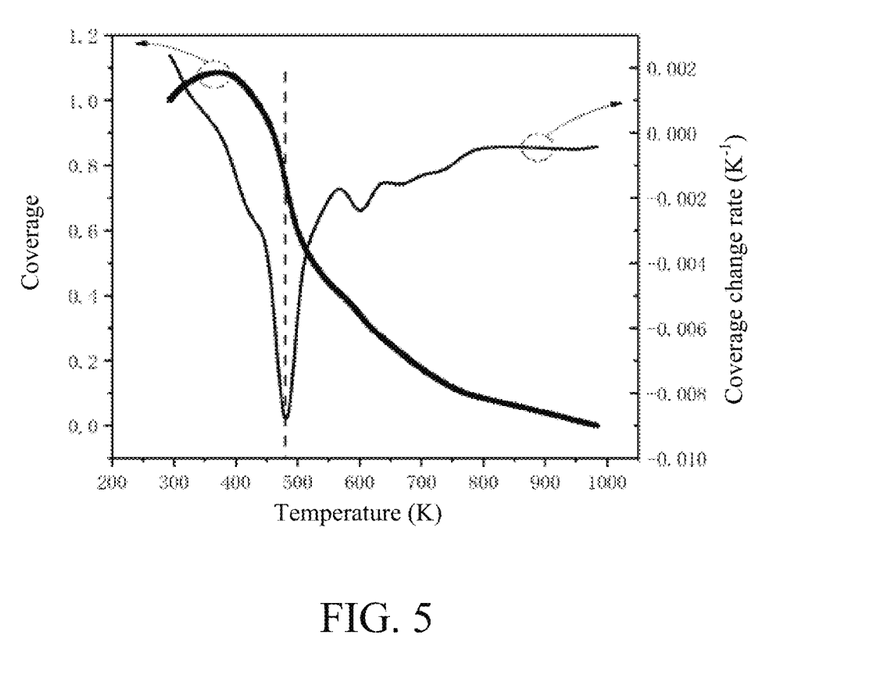
FIG. 5 shows a curve of activation energy of a LaY molecular sieve according to Embodiment 2 of the present disclosure.

Embodiment 2 differs from Embodiment 1 in that: the catalyst to be tested is a LaY molecular sieve in Embodiment 2. To simplify the description, the same parts as in Embodiment 1 are not repeated in Embodiment 2, and the coverage-temperature curve and the coverage change rate-temperature curve of Embodiment 2 are shown in FIG. 5. FIG. 5 is a data processing graph of the kinetic parameters (e.g., the desorption rate constant and the desorption activation energy) of the LaY molecular sieve in Embodiment 2.

In Embodiment 2, the probe molecule is an ammonia molecule, the testing atmosphere is an argon atmosphere, and the heating rate $\beta$ of the programmed heating is 0.2173 K/s. As can be seen in FIG. 5, the coverage change rate-temperature curve of the LaY molecular sieve has one desorption peak, i.e., one acidic site. $T_m$ and $$\left(\frac{d\theta}{dT}\right)_{T_m} \text{(i.e., } T_m = 480 \text{ K}, \left(\frac{d\theta}{dT}\right)_{T_m} = -0.0088\text{)}$$

corresponding to the one local minimum value can be obtained from the coverage change rate-temperature curve (i.e., the dθ/dT−T curve) in FIG. 5, the corresponding coverage (i.e., θ=0.753) can also be obtained obtained from the coverage-temperature curve in FIG. 5, and the desorption rate constant $k_d$ and the desorption activation energy $E_d$ of the acidic site can be calculated according the formula $$k_d = -\frac{\beta\left(\frac{d\theta}{dT}\right)_{T_m}}{\theta_{T_m}}$$

and the formula $$E_d = \frac{RT_m^2 k_d}{\beta},$$

that is, $k_d$=0.0025, $E_d$=22386 J/mol.

Embodiment 3

Figure 6:
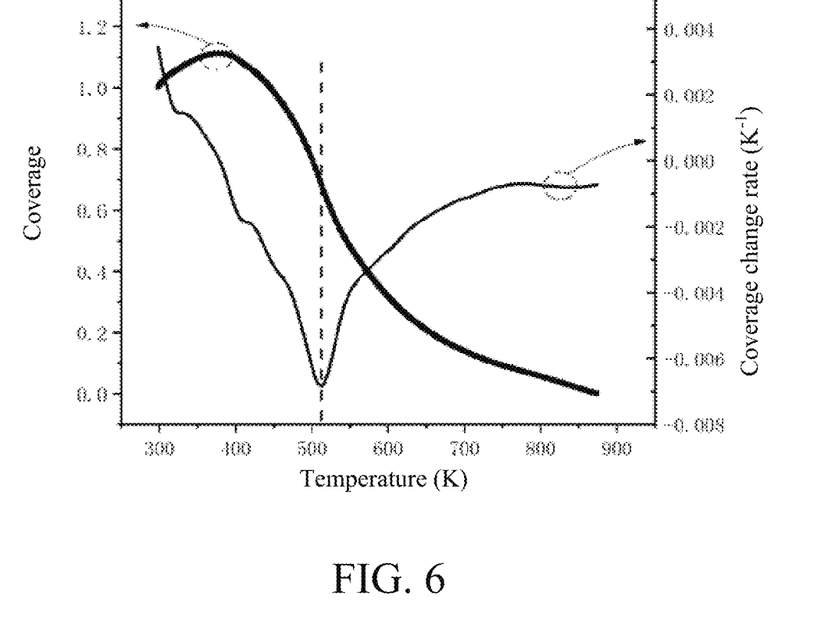
FIGS. 6-7 show curves of activation energy of a NaY molecular sieve according to Embodiment 3 of the present disclosure.

Embodiment 3 differs from Embodiment 1 in that: the catalyst to be tested is a NaY molecular sieve in Embodiment 3. To simplify the description, the same parts as in Embodiment 1 are not repeated in Embodiment 3, and the coverage-temperature curve and the coverage change rate-temperature curve of the NaY molecular sieve of Embodiment 3 are shown in FIG. 6. FIG. 6 is a data processing graph of the kinetic parameters (e.g., the desorption rate constant and the desorption activation energy) of the NaY molecular sieve in Embodiment 3.

In the embodiment, the probe molecule is an ammonia molecule, the testing atmosphere is an argon atmosphere, and the heating rate β of the programmed heating is 0.1811 K/s. As can be seen from FIG. 6, the coverage change rate-temperature curve of the NaY molecular sieve has one desorption peak, i.e., one acidic site. $T_m$ and $$\left(\frac{d\theta}{dT}\right)_{T_m} \text{(i.e., } T_m = 512 \text{ K}, \left(\frac{d\theta}{dT}\right)_{T_m} = -0.00684\text{)}$$

corresponding to the one local minimum value can be obtained from the coverage change rate-temperature curve (i.e., the dθ/dT−T curve) in FIG. 6. The corresponding coverage (i.e., θ=0.688) can also be obtained from the coverage-temperature curve in FIG. 6, and the desorption rate constant $k_d$ and the desorption activation energy $E_d$ of the acidic site can be calculated according the formula $$k_d = -\frac{\beta\left(\frac{d\theta}{dT}\right)_{T_m}}{\theta_{T_m}}$$

and the formula $$E_d = \frac{RT_m^2 k_d}{\beta},$$

that is, $k_d$=0.0018, $E_d$=21667.94 J/mol.

Figure 7:
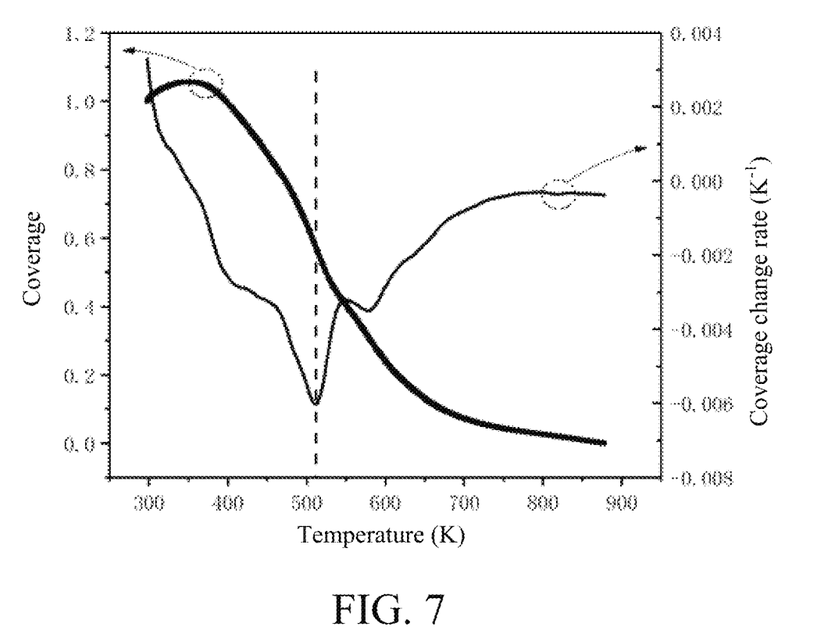

In another embodiment, based on the integrated self-heating resonant cantilever, the NaY molecular sieve is tested again using the same measurement method as in Embodiment 3, thereby obtaining the coverage-temperature curve and the coverage change rate-temperature curve of the NaY molecular sieve shown in FIG. 7. FIG. 7 is a data processing graph of the kinetic parameters (e.g., the desorption rate constant and the desorption activation energy) of the NaY molecular sieve in another Embodiment 3.

In the embodiment, the probe molecule is an ammonia molecule, the testing atmosphere is an argon atmosphere, and the heating rate β of the programmed heating is 0.1824 K/s. As can be seen from FIG. 7, the coverage change rate-temperature curve of the NaY molecular sieve has one desorption peak, i.e., one acidic site. $T_m$ and $$\left(\frac{d\theta}{dT}\right)_{T_m} \text{(i.e., } T_m = 512 \text{ K}, \left(\frac{d\theta}{dT}\right)_{T_m} = -0.006\text{)}$$

corresponding to the one local minimum value can be obtained from the coverage change rate-temperature curve (i.e., the dθ/dT—curve) in FIG. 7. The corresponding coverage (i.e., θ=0.574) can also be obtained from the coverage-temperature curve in FIG. 7, and the desorption rate constant $k_d$ and the desorption activation energy $E_d$ of the acidic site can be calculated according the formula $$k_d = -\frac{\beta\left(\frac{d\theta}{dT}\right)_{T_m}}{\theta_{T_m}}$$

and the formula $$E_d = \frac{RT_m^2 k_d}{\beta},$$

that is, $k_d$=0.0019, $E_d$=22781.87 J/mol.

From the above results, it can be seen that the method for measuring activation energy of the catalyst using the integrated self-heating resonant cantilever has good reproducibility.

By testing the above three samples to be tested, the method for measuring activation energy of catalysts using the integrated self-heating resonant cantilever has good implementability and is fast and convenient, and has other advantages, such as, accurate measurement results, low consumption of samples, and low price.

As described above, in the method of the present disclosure, the resonant frequency change-time curve can be obtained using the integrated self-heating resonant cantilever, the resonant frequency change-time curve can be converted into the resonant frequency change-temperature curve, the resonant frequency change-temperature curve can be converted into the coverage-temperature curve, the coverage change rate-temperature curve is obtained by performing first-order differentiation on the coverage-temperature curve, relevant parameters corresponding to local minimum values can be obtained from the coverage change rate-temperature curve, and then the relevant parameters are substituted into the calculation formulas to obtain the desorption rate constant of the catalyst and the desorption activation energy of the catalyst. It can be seen that the method for measuring activation energy of the catalyst of the present disclosure simply requires programmed heating in terms of operating on the samples, which is fast and convenient. In addition, the method also has other advantages, such as, accurate measurement results, low consumption of samples, and low price.

The above embodiments are illustrative of the principles and benefits of the disclosure rather than restrictive of the scope of the disclosure. Persons skilled in the art can make modifications and changes to the embodiments without departing from the spirit and scope of the disclosure. Therefore, all equivalent modifications and changes made by persons skilled in the art without departing from the spirit and technical concepts disclosed in the disclosure shall still be deemed falling within the scope of the claims of the disclosure.

What is claimed is:

1. A method for measuring activation energy of a catalyst, comprising:
providing an integrated self-heating resonant cantilever;
placing the catalyst in a sampling area of the integrated self-heating resonant cantilever;
providing a probe molecule, and adsorbing the probe molecule with the catalyst;
desorbing the probe molecule from the catalyst by performing programmed heating on the integrated self-heating resonant cantilever, and obtaining a resonant frequency change-time curve of the integrated self-heating resonant cantilever during the programmed heating,
wherein the obtaining of the resonant frequency change-time curve comprises: obtaining a first preliminary resonant frequency change-time curve by performing a first programmed heating on the integrated self-heating resonant cantilever;
obtaining a second preliminary resonant frequency change-time curve by performing a second programmed heating on the integrated self-heating resonant cantilever; and
obtaining the resonant frequency change-time curve by subtracting the second preliminary resonant frequency change-time curve from the first preliminary resonant frequency change-time curve;
converting the resonant frequency change-time curve into a resonant frequency change-temperature curve by means of a formula T=βt, wherein T represents a temperature of the integrated self-heating resonant cantilever, t represents a heating duration of the programmed heating, and β represents a heating rate of the programmed heating;
converting the resonant frequency change-temperature curve into a coverage-temperature curve by means of a formula $$\theta = \frac{\Delta f_m - \Delta f}{\Delta f_m},$$

wherein θ represents the coverage, $\Delta f_m$ represents a total resonant frequency change during the desorbing of the probe molecule, $\Delta f$ represents a transient resonant frequency change at a certain time during the desorbing of the probe molecule;
obtaining a coverage change rate-temperature curve by performing first-order differentiation on the coverage-temperature curve, and obtaining $T_m$ and $$\left(\frac{d\theta}{dT}\right)_{T_m}$$

corresponding to local minimum values of the coverage change rate-temperature curve, wherein $T_m$ represents a temperature value where the coverage change rate-temperature curve has a local minimum, $$\left(\frac{d\theta}{dT}\right)_{T_m}$$

represents a coverage change rate where the coverage change rate-temperature curve has a local minimum; and
obtaining a desorption rate constant $k_d$ of the catalyst and a desorption activation energy $E_d$ of the catalyst by means of a formula $$E_d = \frac{RT_m^2 k_d}{\beta},$$

and a formula $$k_d = -\frac{\beta\left(\frac{d\theta}{dT}\right)_{T_m}}{\theta_{T_m}}$$

wherein R represents the gas constant,
wherein adsorbing the probe molecule with the catalyst comprises:
heating the integrated self-heating resonant cantilever in an ammonia gas atmosphere with a flow rate of 50 mL/min to cause the catalyst to adsorb the probe molecule,
performing real-time frequency measurement during adsorption to determine a degree of adsorption, and
completing the adsorption when a catalyst coverage reaches 1, thereby improving accuracy of the measuring of the activation energy of the catalyst.

2. The method for measuring activation energy of the catalyst according to claim 1, wherein before the catalyst adsorbs the probe molecule, the method further comprises cleaning the integrated self-heating resonant cantilever.

3. The method for measuring activation energy of the catalyst according to claim 1, wherein before the catalyst adsorbs the probe molecule, the method further comprises pretreating the catalyst to clean the catalyst.

4. The method for measuring activation energy of the catalyst according to claim 1, wherein after the catalyst adsorbs the probe molecule and before the catalyst desorbs the probe molecule, the method further comprises removing physical adsorbate on the catalyst.

5. The method for measuring activation energy of the catalyst according to claim 1, wherein a mass of the catalyst is in a range of $10^{12}$ g to $10^{-6}$ g.

6. The method for measuring activation energy of the catalyst according to claim 1, wherein the temperature T of the integrated self-heating resonant cantilever during the programmed heating is in a range of 25° C. to 1000° C.

7. The method for measuring activation energy of the catalyst according to claim 1, wherein the heating rate β of the programmed heating is greater than 5000° C./s, with a temperature control accuracy smaller than 0.5° C.

8. The method for measuring activation energy of the catalyst according to claim 1, wherein the catalyst comprises one of a ZSM-5 molecular sieve, a LaY molecular sieve, and a NaY molecular sieve, wherein the probe molecule comprises an ammonia molecule.

9. The method for measuring activation energy of the catalyst according to claim 1, wherein the integrated self-heating resonant cantilever comprises a resonant cantilever, a resonant drive circuit, a resonant frequency detection circuit, a heating component, and a temperature detection circuit, wherein the resonant drive circuit drives the resonant cantilever to generate a resonant frequency, wherein the resonant frequency detection circuit measures the resonant frequency generated by the resonant cantilever in real-time, wherein the heating component heats the catalyst, wherein the temperature detection circuit measures a temperature of the resonant cantilever in real-time.

* * * * *